(12) United States Patent
Ward et al.

(10) Patent No.: US 10,259,368 B2
(45) Date of Patent: Apr. 16, 2019

(54) ARTICULATING ARMREST

(71) Applicant: Cessna Aircraft Company, Wichita, KS (US)

(72) Inventors: Barry John Ward, Bel Aire, KS (US); David Michael Kuhn, Wichita, KS (US); David Wayne Davis, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 15/218,806

(22) Filed: Jul. 25, 2016

(65) Prior Publication Data

US 2017/0021749 A1 Jan. 26, 2017

Related U.S. Application Data

(60) Provisional application No. 62/196,548, filed on Jul. 24, 2015.

(51) Int. Cl.
*B60N 2/46* (2006.01)
*B60N 2/75* (2018.01)
*B60N 3/10* (2006.01)

(52) U.S. Cl.
CPC .............. *B60N 2/79* (2018.02); *B60N 2/757* (2018.02); *B60N 3/102* (2013.01)

(58) Field of Classification Search
CPC .............................. B60N 2/4613; B60N 2/468
USPC ....... 297/113, 411.3, 411.32, 411.35, 411.38
See application file for complete search history.

(56) References Cited

U.S. PATENT DOCUMENTS

| | | | | |
|---|---|---|---|---|
| 4,435,011 A | * | 3/1984 | Hakamata | B60N 2/4613 297/113 |
| 4,558,901 A | | 12/1985 | Yokoyama | |
| 4,674,790 A | | 6/1987 | Johnson | |
| 5,433,503 A | * | 7/1995 | De Filippo | B60N 2/4613 297/113 |
| 5,603,682 A | * | 2/1997 | Grider | A47C 7/40 248/292.14 |
| 8,449,029 B2 | * | 5/2013 | Runde | B60N 2/4613 297/113 |
| 8,528,861 B2 | | 9/2013 | Kneller et al. | |
| 8,789,881 B2 | * | 7/2014 | von Rothkirch und Panthen | B60N 2/4613 297/113 X |
| 9,616,787 B2 | * | 4/2017 | Siqueira | B60N 2/4613 |

(Continued)

*Primary Examiner* — Rodney B White
(74) *Attorney, Agent, or Firm* — Erise IP, P.A.

(57) ABSTRACT

An articulating armrest includes a first protrusion and a second protrusion that protrude from a member a predetermined spacing apart. Each protrusion aligns within a separate track within a housing configured for stowing the armrest within a seat back. The two tracks include straight and curved portions configured to articulate the armrest. Specifically, the armrest moves along a curvilinear path between stowed and deployed positions by translating along the tracks and pivoting about the second protrusion. The armrest may stow in a seat back and beneath the seat bottom to provide a full length armrest when deployed, and the armrest may stow flush with the seat back for sitting against. Mechanical tension may be provided to automatically deploy the armrest, and a rotational damper and a gas spring may be used to control the speed at which the armrest deploys.

22 Claims, 16 Drawing Sheets

(56) References Cited

U.S. PATENT DOCUMENTS

| | | | |
|---|---|---|---|
| 2006/0071529 A1* | 4/2006 | Yetukuri | B60N 2/4613 297/411.32 |
| 2008/0301909 A1* | 12/2008 | Chien | G06F 1/1622 16/362 |
| 2009/0167070 A1* | 7/2009 | Chen | B60N 2/4606 297/411.32 |
| 2010/0148561 A1* | 6/2010 | Runde | B60N 2/4613 297/411.33 |
| 2011/0115275 A1* | 5/2011 | von Rothkirch und Panthen | B60N 2/4613 297/411.32 |
| 2012/0032489 A1 | 2/2012 | Kladde | |
| 2012/0223564 A1* | 9/2012 | Andersson | B60N 2/4673 297/411.3 |

* cited by examiner

1400

USER PRESSES UPWARD ON TIP OF ARMREST CAUSING IT
TO PIVOT INWARD AND UPWARD
1410

USER PRESSES DOWWARD ON TIP OF ARMREST TO LOWER
INTO HOUSING
1420

USER PRESSES DOWNWARD AND INWARD ON TIP OF
ARMREST TO STOW IN HOUSING
1430

*FIG. 14*

ARTICULATING ARMREST

CROSS-REFERENCE TO RELATED APPLICATIONS

This application claims priority of U.S. Provisional Patent Application No. 62/196,548, filed Jul. 24, 2015, which is incorporated herein by reference.

BACKGROUND

Typical aircraft armrests are designed with a stationary pivot which allows the armrest to pivot between a horizontal position when the armrest is in use and a vertical position when the armrest is not in use. A stationary pivot armrest is disadvantageous because in order to stow within or beneath a seat back, the armrest is either short, narrow or both, and therefore it does not provide comfortable support or ample storage room (e.g., to enable cup holders for storing beverages during flight).

DESCRIPTION OF THE INVENTION

1. Field of the Invention

Embodiments of the present disclosure relate generally to the field of vehicle seating and more specifically to the field of aircraft seating.

2. Description of the Related Art

U.S. Pat. No. 4,558,901 to Yokoyama discloses an arm rest device with two link arms for pivoting the arm rest to alternate between a horizontal position and a vertical position within a seat back.

U.S. Pat. No. 4,674,790 to Johnson discloses an adjustable arm rest and console for mounting on the floor between seats. The arm rest may pivot between horizontal and vertical positions but does not stow within a seat.

U.S. Pat. No. 8,528,861 to Kneller et al. discloses a seating system that includes a plurality of armrests located between seats. The plurality of armrests may pivot between a horizontal position and a vertical position within a seat back to enable adjustment of effective seat width.

U.S. Patent Application No. 2012/0032439 to Kladde discloses an armrest for an aircraft seat. The armrest includes a first pivot member for pivoting about a first axis and a second pivot member for pivoting about a second axis perpendicular to the first axis.

SUMMARY

In an embodiment, an armrest, is provided. The armrest includes a first protrusion proximate a first end, and a second protrusion at a predetermined spacing from the first protrusion; and, a housing having a first track for guiding movement of the first protrusion and a second track for guiding movement of the second protrusion, the movement of the first and second protrusions relative to one another enabling the armrest to enter through a plurality of phases of deployment, comprising: a release phase in which the armrest is released from the housing; a translation phase in which the armrest is translated a distance; an articulation phase in which the armrest flips out of the housing; and, a securement phase where the armrest is secured in place.

In another embodiment, a method of deploying an armrest is provided. The method includes providing a housing for stowing the armrest in a stowed position, the armrest being mounted on a moveable axis such that the armrest can be angularly rotated downward and outward relative to the housing and into a deployed position; using a mechanical tension device to provide a force to the armrest as the armrest moves from the stowed position into the deployed position, the mechanical tension device being mechanically coupled to a protrusion of the armrest and slidably secured along a track.

In yet another embodiment, an armrest is provided. The armrest includes a housing for stowing the armrest within a seat back, the housing comprising: a first pair of opposing tracks configured for guiding a first protrusion of the armrest; and, a second pair of opposing tracks configured for guiding a second protrusion of the armrest; and, a mechanical tension device mechanically coupled to the housing for pulling the armrest, wherein the first protrusion translates along the first pair of opposing tracks and the second protrusion translates along the second pair of opposing tracks, and the first and second pairs of opposing tracks are configured for the armrest to articulate from a stowed position to a deployed position by pivoting and translating along a curvilinear path.

In yet another embodiment, a system is provided. The system includes a first axially-aligned protrusion proximate a first end of a transversely-aligned member; a second axially-aligned protrusion substantially parallel to the first axially-aligned protrusion, located further from the first end of the transversely-aligned member than is the first axially-aligned protrusion; and, the transversely-aligned member being deployed from a housing, the housing including: a first slot configured for receiving and guiding the first axially-aligned protrusion, the first slot having a curved lower end and a straight upper end forming a J-shaped path (when viewed in cross-section) for guiding the first axially-aligned protrusion; and, a second slot for receiving the second protrusion, the second slot being aligned relatively adjacent the first slot, the second slot having a substantially straight lower portion and a curved upper portion (when viewed in cross-section) for guiding the second protrusion away from the first slot, such that the transversely-aligned member moves upwards and pivots outwards from the housing when deployed.

BRIEF DESCRIPTION OF THE DRAWINGS

Illustrative embodiments of the present invention are described in detail below with reference to the attached drawing figures, which are incorporated by reference herein and wherein:

FIG. 14 is a block diagram of a method for stowing an articulating armrest, in an embodiment.

DETAILED DESCRIPTION

Embodiments of the present disclosure may be useful in any application in which an armrest is desired. Thus, while the description herein is directed towards use of an articulating armrest in aircraft, it shall be understood that the articulating armrest may be incorporated into seats of other vehicles. The term "articulating" as used in this application should be interpreted as meaning that the armrest is capable of movement in one or a plurality of directions. Or put another way, the armrest may pivot and translate to articulate along a curvilinear path. In certain embodiments, the articulating armrest is configured for use in a couch on an aircraft. Because the armrest is part of a couch configured for seating a plurality of persons, the armrest has been configured to be flush with the couch back when stowed for compatibility with sitting or leaning against. The couch may be a side facing couch oriented to face one side of the aircraft (see e.g., FIGS. 3 and 4).

Figure 1:
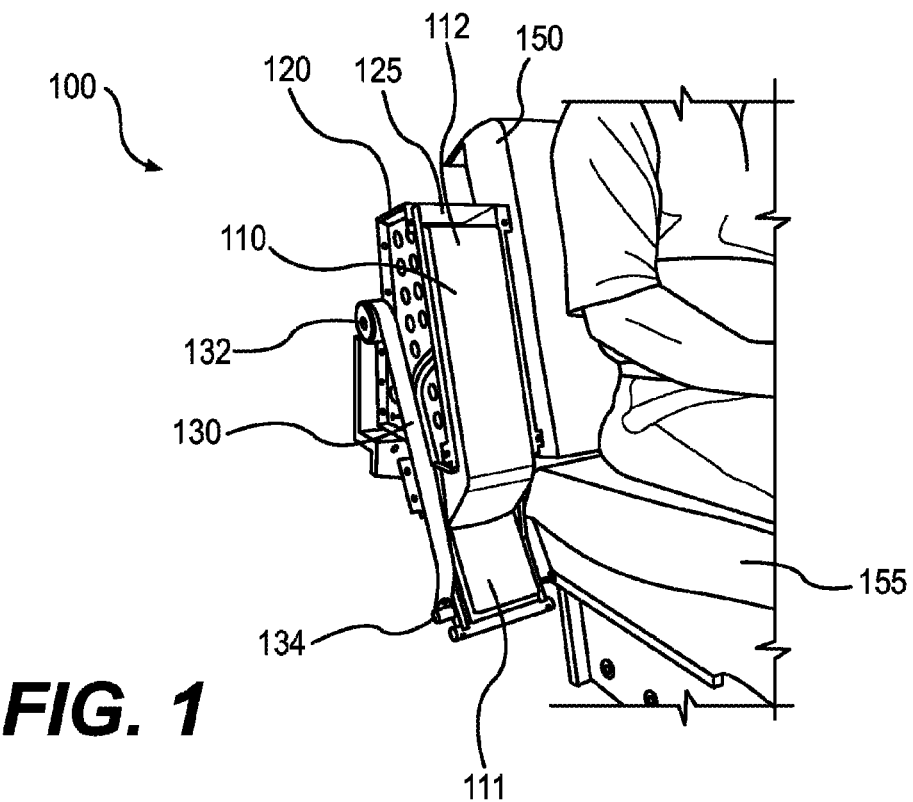
FIG. 1 is a perspective view showing an embodiment of an articulating armrest stowed with a portion of a couch removed to permit viewing components of the articulating armrest.
Figure 2:
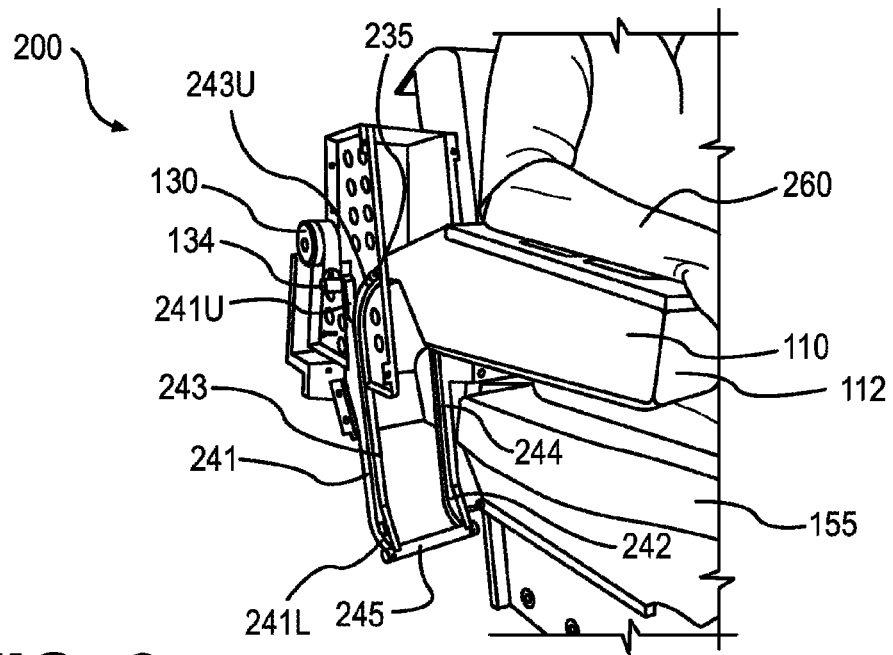
FIG. 2 is a perspective view showing the articulating armrest of FIG. 1 in a deployed position.
Figure 15:
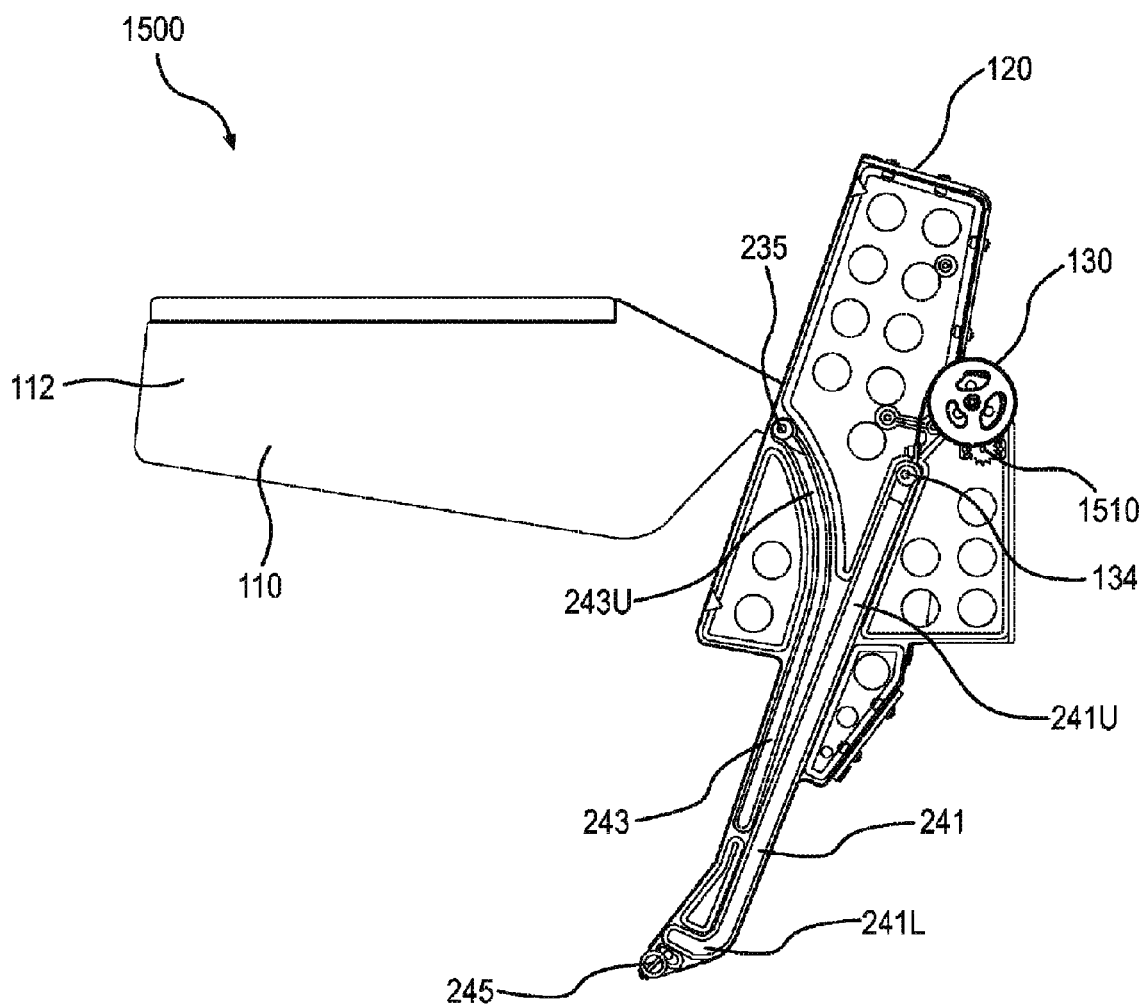
FIG. 15 shows a first side view of an articulating armrest, in an embodiment.
Figure 16:
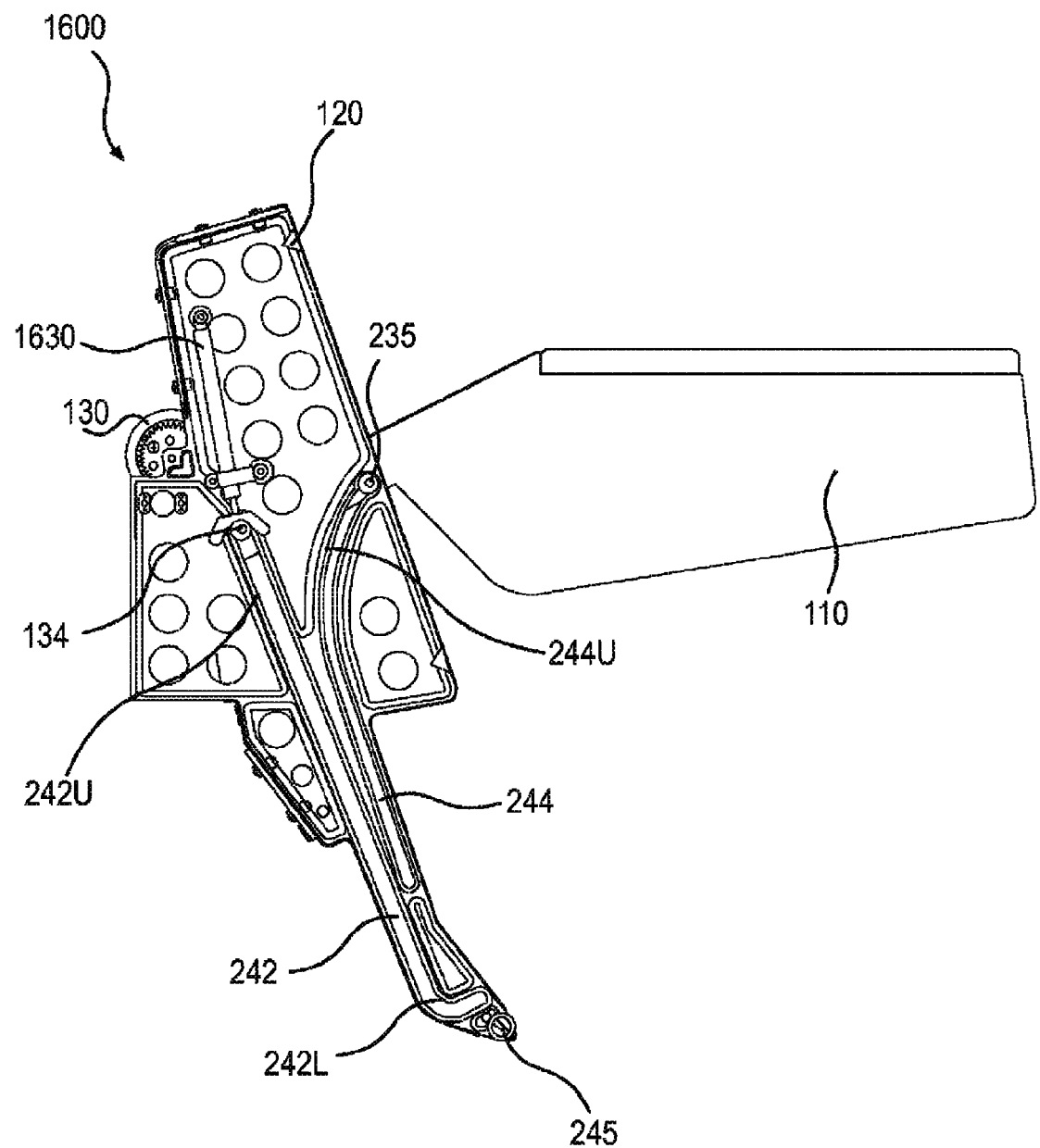
FIG. 16 shows a second side view of an articulating armrest opposite the first side view of FIG. 15, in an embodiment.

FIG. 1 is a perspective view showing an articulating armrest 100 in a stowed position. In the perspective views of FIGS. 1, 2, and 5-12, only a portion of a couch is depicted and an adjacent portion of the couch is removed to provide illustration of various components that would normally be hidden from view. For example, FIGS. 3 and 4 described below, illustrate embodiments of an articulating armrest within a couch such that some components depicted in FIGS. 1 and 2 are not visible in FIGS. 3 and 4. FIGS. 15 and 16 show side views of opposite sides of an articulating armrest in the deployed position, which may be helpful for viewing certain components not clearly visible in the perspective view of FIGS. 1, 2, and 5-12.

Figure 3:
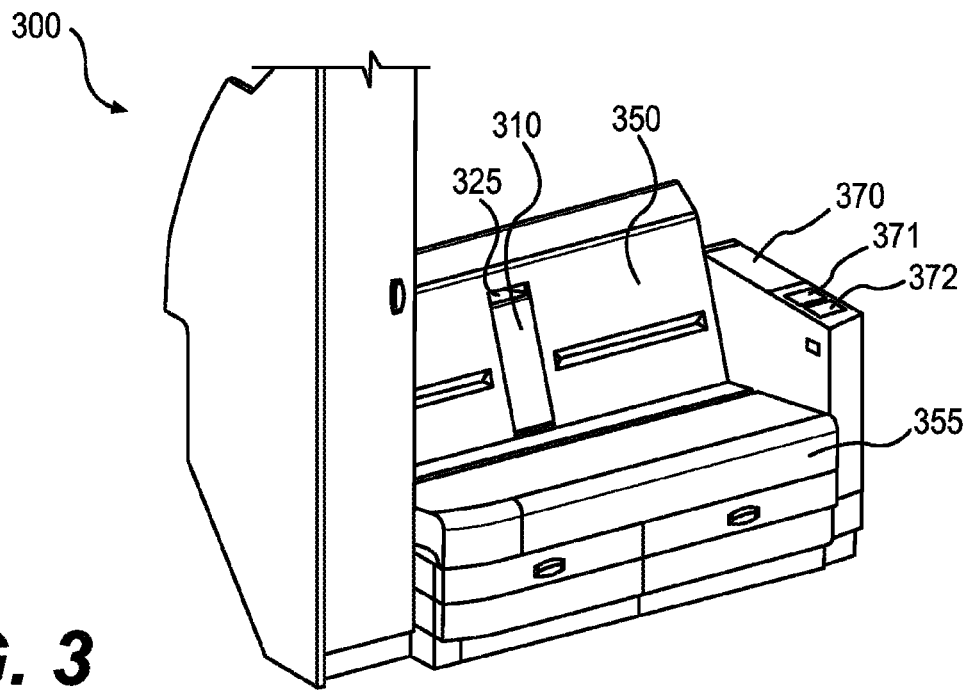
FIG. 3 is a perspective view showing an articulating armrest stowed within a couch back of a side-facing couch, in an embodiment.

Articulating armrest 100 includes a member 110 stowed in a housing 120 adjacent to portions of a couch. The couch includes a couch back 150, which is an example of a seat back, and a couch bottom 155, which is an example of a seat bottom. Member 110 may be configured to provide a full length armrest such that at least a portion of member 110 may extend beneath couch bottom 155 when stowed. Member 110 includes a first end 111 located beneath couch bottom 155 when stowed, and a second end or tip 112 located adjacent couch back 150 when stowed. Housing 120 is receded within couch back 150 and may include a back wall and two side walls configured for receiving member 110. An underside of member 110 provides a substantially flush surface with couch back 150 for sitting against when stowed, except for a gap 125 that enables a user to access tip 112 for retrieval. In an embodiment, FIG. 3 shows a stowed armrest 310 with an underside substantially flush with a couch back 350 for sitting against, except for a gap 325 for retrieval.

Returning to FIG. 1, a spring 130 is mechanically coupled to a first protrusion 134 via a clamp, collar or the like. First protrusion 134 protrudes axially from first end 111 of member 110, which is aligned transversely with respect to couch back 150 and couch bottom 155. While member 110 is stowed in housing 120, spring 130 is in an extended configuration, as depicted in FIG. 1, such that tension of spring 130 pulls protrusion 134 upward as further described below. Spring 130 is for example a clock spring coiled on a reel about an axis 132. In an embodiment, spring 130 is replaced by another mechanical tension device, such as a different sort of spring, an electric motor, or a counterweight for providing an upward force to first protrusion 134.

FIG. 2 is a perspective view showing an articulating armrest 200 in a deployed position. Articulating armrest 200 is an example of articulating armrest 100, FIG. 1 with member 110 oriented in the deployed position and spring 130 coiled such that first protrusion 134 is raised above couch bottom 155. FIG. 2 further shows a user's arm 260 on member 110 indicating that member 110 has a length long enough to accommodate a typical user's forearm. The same components in FIGS. 1 and 2 are enumerated with like numerals and their description may not be repeated accordingly.

In certain embodiments, first protrusion 134 extends through member 110 and protrudes out of a far side into a second track 242. FIGS. 15 and 16 show side views of opposite sides of member 110 in the deployed position to reveal associated components not visible in the perspective view of FIG. 2. As can be seen from these figures, first protrusion 134 is positioned for moving within both first track 241 and second track 242 that form a first pair of opposing tracks, which are symmetrically curvilinear and substantially parallel to one another and located on opposite sides of housing 120. More specifically, first and second tracks 241, 242 may be formed of slots that have been defined into the opposing walls of housing 120 that contain member 110 when stowed. Alternatively, first and second tracks 241, 242 may be formed of rails and first protrusion 134 includes at each end a pair of wheels positioned on either side of the rails for rolling along.

FIG. 15 shows first track 241 in a first side of housing 120, whereas FIG. 16 shows second track 242 in a second side opposite the first side of housing 120. As viewed from the side view of FIG. 15, first track 241 includes a lower portion 241L with a hooked or curved shape, an upper portion 241U that is substantially straight, and a middle portion between lower portion 241L and upper portion 241U that is also substantially straight. First track 241 may be said to have a "J-shape" as viewed from the side or cross-section. As viewed from a cross-sectional view or the side view of FIG. 16, second track 242 similarly includes a lower portion 242L with a hooked or curved shape, an upper portion 242U that is substantially straight, and a middle portion between lower portion 242L and upper portion 242U to match first track 241. Together, first track 241 and second track 242 form the first pair of opposing tracks configured to guide first protrusion 134. First protrusion 134 is located in the uppermost ends of first upper track 241U and second upper track 242U when member 110 is deployed, as shown in FIGS. 15 and 16, respectively.

Returning to FIG. 2, a second protrusion 235 is aligned axially with transversely-aligned member 110. Protrusion 235 is configured and positioned for moving within a third track 243 as best viewed in FIG. 15. Alternatively, protrusion 235 extends axially from opposite sides of member 110, and the ends of protrusion 235 are configured and positioned for moving within third track 243 and a fourth track 244, which are substantially parallel to one another and located on opposite sides of housing 120. FIG. 15 shows third track 243 in the first side of housing 120, whereas FIG. 16 shows fourth track 244 in the second side opposite the first side of housing 120. As viewed from the side view of FIG. 15, third track 243 is substantially straight except for an upper curved portion 243U. As viewed from the side view of FIG. 16, fourth track 244 is similarly substantially straight except for an upper curved portion 244U to match third track 243. Together, third track 243 and fourth track 244 form a second pair of opposing tracks configured to guide second protrusion 235. Second protrusion 235 is located in the uppermost ends of third upper track 243U and fourth upper track 244U when member 110 is deployed, as shown in FIGS. 15 and 16, respectively. A stay 245 may extend between lower ends of housing 120 to provide structural support for maintaining substantially parallel alignment between the first and second pairs of opposing tracks.

Note that member 110 may be configured for articulating with only one set of tracks, such as first track 241 and third track 243, and first and second protrusions 134, 235 may protrude out of either side of member 110 or alternatively may be accessible to the tracks within an inner portion of member 110. By using only one set of tracks, instead of opposing pairs of tracks, member 110 may be configured along an aisle at the end of a seat or couch as opposed to in the middle of a couch as depicted in FIG. 3 for example.

FIG. 3 is a perspective view showing an articulating armrest 310 stowed flush with a couch back 350 of a side-facing couch 300. Articulating armrest 310 is an example of articulating armrest 100, FIG. 1. Side-facing couch 300 includes a couch bottom 355 and a stationary armrest 370, which further includes a first cup holder 371 and a second cup holder 372.

Figure 4:
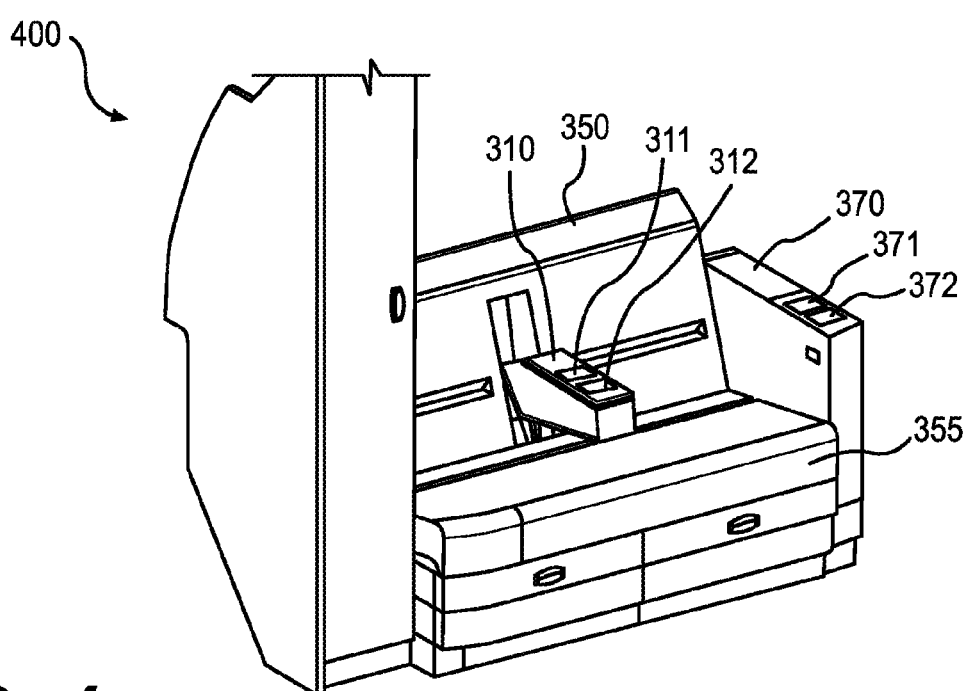
FIG. 4 is a perspective view showing the articulating armrest of FIG. 3 deployed in a side-facing couch.

FIG. 4 is a perspective view showing articulating armrest 310 deployed in a side-facing couch 400. Side-facing couch 400 is an example of side-facing couch 300, FIG. 3. The same components in FIGS. 3 and 4 are enumerated with like numerals and their description may not be repeated accordingly. Articulating armrest 310 includes a third cup holder 311 and a fourth cup holder 312 that are accessible while articulating armrest 310 is deployed.

In operation, member 110 articulates by simultaneously pivoting and translating along a curvilinear path. While deploying member 110, the transition between stowed and deployed positions occurs through the following four distinct phases: 1) release, 2) translation, 3) articulation, and 4) securement. FIGS. 5-8 provide perspective views showing operation of member 110 by a user for moving through each of the four distinct phases of transition from the stowed orientation to the deployed orientation. For stowing member 110, the transition between deployed and stowed positions occurs through the four distinct phases in reverse. FIGS. 9-12 provide perspective views showing operation of member 110 by a user through the four distinct phases in reverse.

Figure 17:
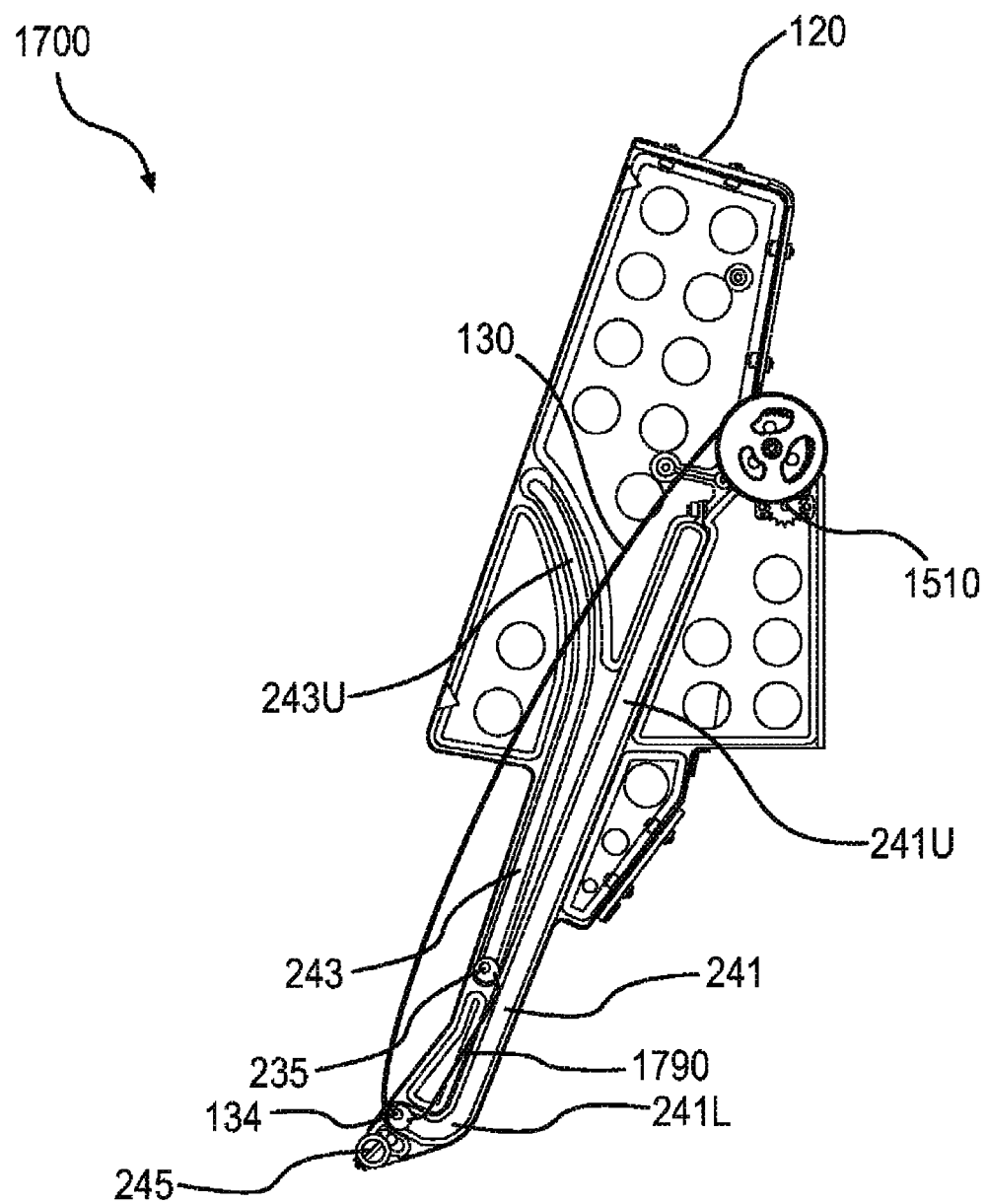
FIG. 17 shows a side view of an articulating armrest in a stowed position, in an embodiment.

The four distinct phases of member 110 are best described by observing the position of first protrusion 134 and second protrusion 235 within the first and second pair of opposing tracks, respectively, which are best shown using a side view. FIG. 17 shows a side view of member 110 in the stowed position, and FIG. 22 shows a side view of member 110 in the deployed position. FIGS. 18-21 show side views for each of the four distinct phases, respectively, as member 110 articulates from the stowed position (e.g., FIG. 17) to the deployed position (FIG. 22). Note that in FIGS. 17-22, a predetermined spacing 1790 between first protrusion 134 and second protrusion 235 remains constant since first protrusion 134 and second protrusion 235 maintain fixed positions within member 110.

Figure 5:
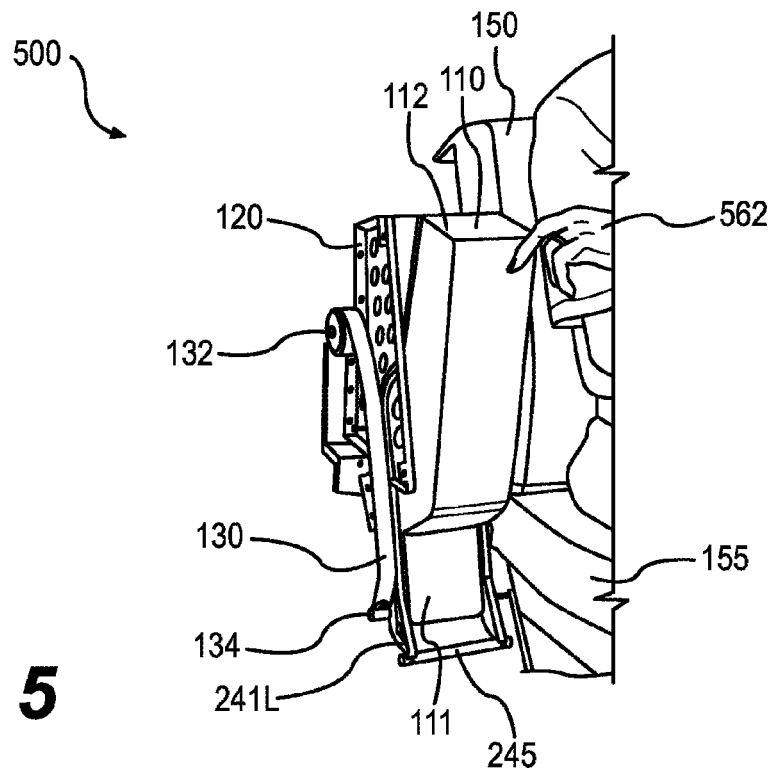
FIG. 5 is a perspective view showing an embodiment of an articulating armrest as a user pulls the tip of a member out of a housing.

FIG. 5 is a perspective view showing an articulating armrest 500 as a user pull tip 112 of member 110 out of housing 120 to initiate the release phase for deployment. The user may insert his or her fingers or a hand 562 into gap 125, FIG. 1 and pull on tip 112 in an outward direction (e.g., away from couch back 150). FIG. 17 shows the position of first protrusion 134 and second protrusion 235 in the bottom of first track 241 and third track 243, respectively. When the user initiates deployment by pulling tip 112 in an outward direction, first protrusion 134 moves along the hooked or curved portion of lower first track 241L while member 110 pivots about second protrusion 235 which remains stationary in third track 243, arriving at the position shown in FIG. 18. Second protrusion 235 may function as an axis for member 110 to pivot or rotate angularly about, and since second protrusion 235 may move within third track 243, second protrusion 235 may be referred to as a "moveable axis".

Figure 18:
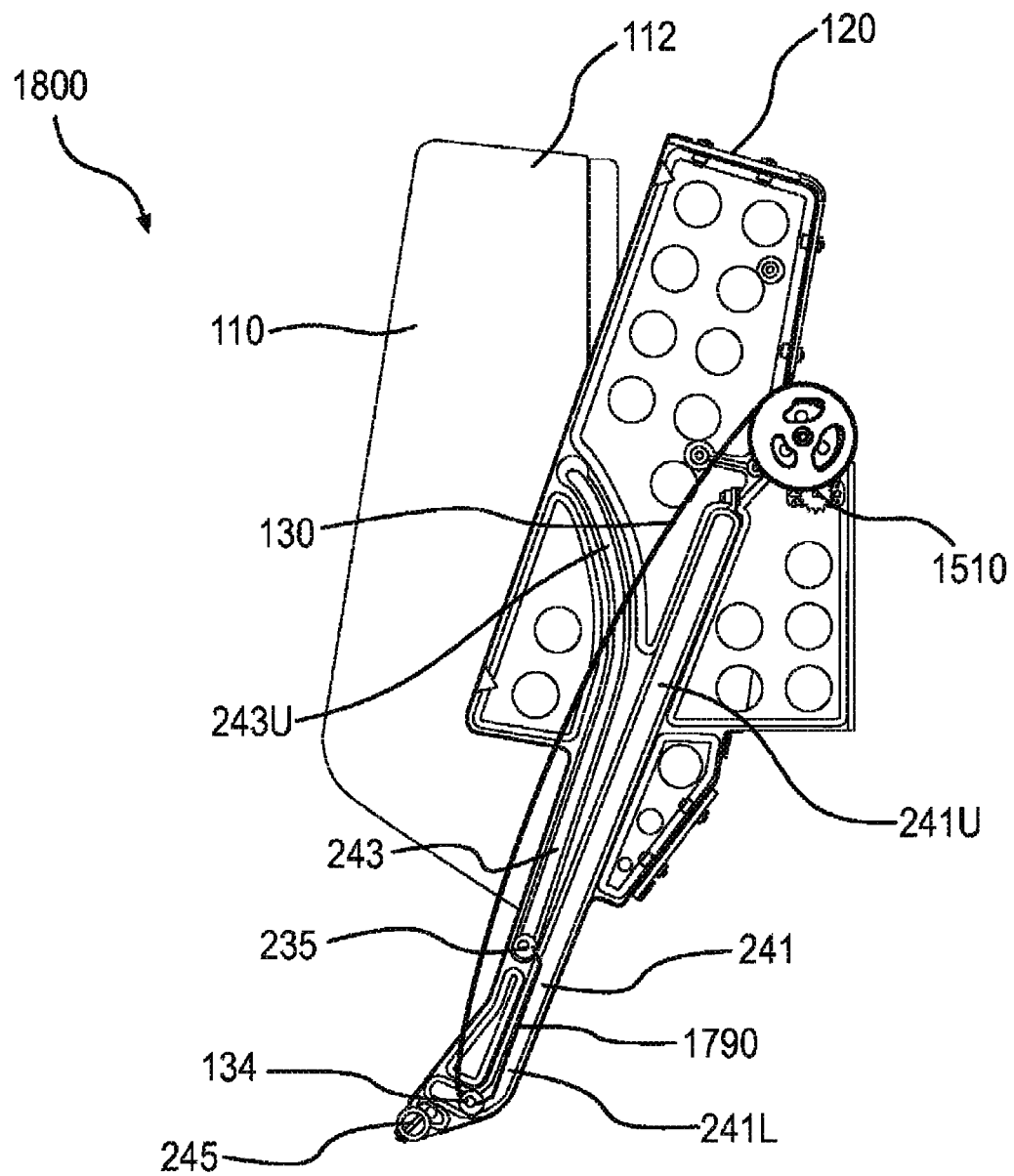
FIG. 18 shows a side view of an articulating armrest in a release phase of deployment, in an embodiment.

FIG. 18 shows articulating armrest 1800 in the release phase in which first protrusion 134 is located in the hooked or curved portion of lower first track 241L and second protrusion 235 remains in the bottom of third track 243. Note that the hooked or curved portion of first track 241L prevents first protrusion 134 from being pulled upward by spring 130, but once first protrusion 134 passes through the hooked or curved portion of lower first track 241L, spring 130 pulls upward on first protrusion 134, marking the beginning of the translation phase. In an embodiment, spring 130 is replaced with a mechanical tension device for providing tension to first protrusion 134, such as a counterweight or an electric motor.

Figure 6:
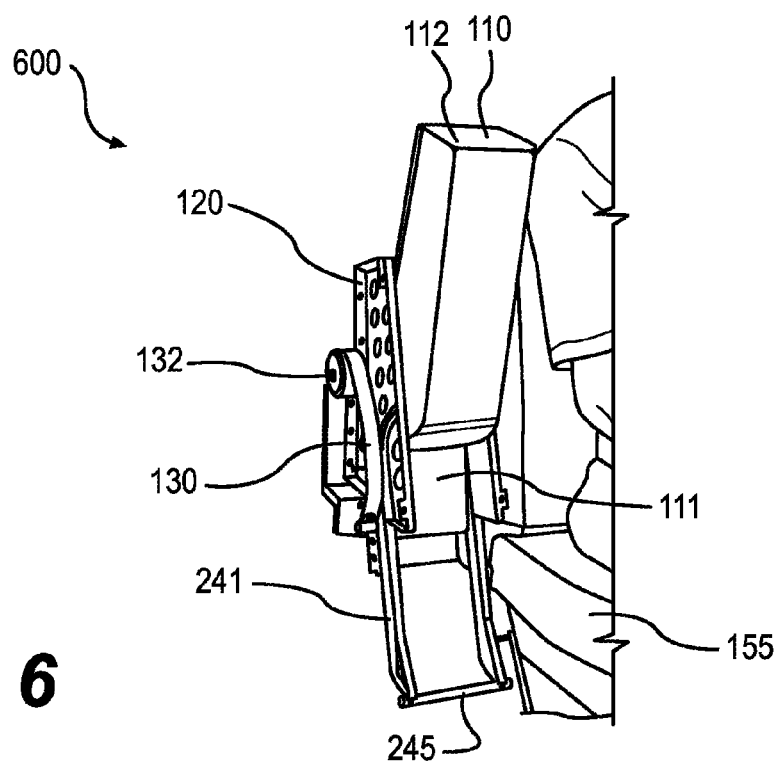
FIG. 6 is a perspective view showing an embodiment of an articulating armrest during a translation phase of deployment.

FIG. 6 is a perspective view showing an articulating armrest 600 during the translation phase of deployment of member 110. Note that the user is no longer touching member 110 as it translates linearly upward due to tension provided by spring 130 to first protrusion 134. In an embodiment, the speed at which spring 130 pulls on first protrusion 134 is controlled using a rotational damper (see item 1510, FIG. 15).

Figure 19:
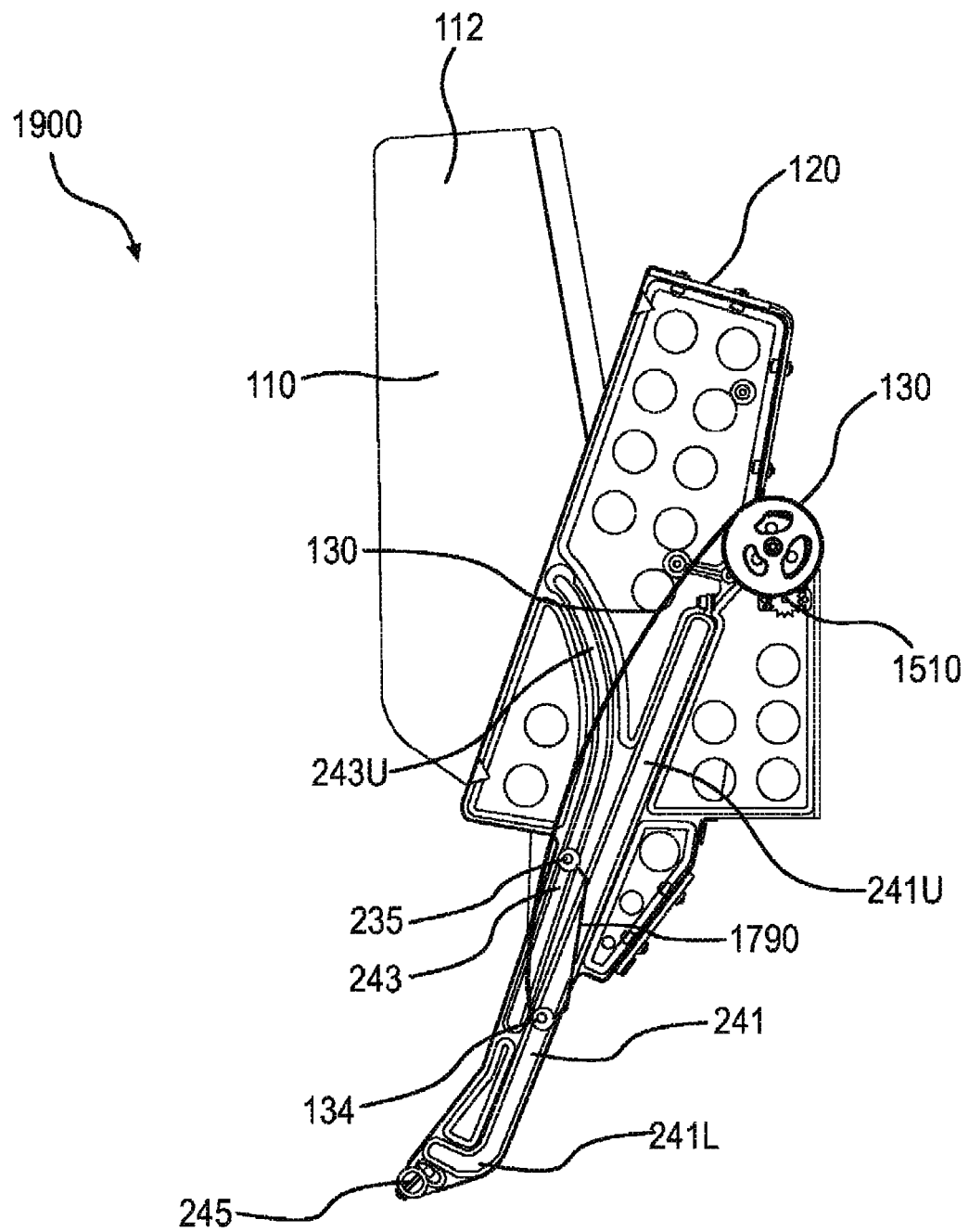
FIG. 19 shows a side view of an articulating armrest in a translation phase of deployment, in an embodiment.

FIG. 19 shows an articulating armrest 1900 during the translation phase in which member 110 is translating linearly upwards. First protrusion 134 is located in the substantially straight portion of first track 241 and second protrusion 235 is located in the substantially straight portion of third track 243, thereby providing upward linear translation of member 110. The distance of the translation phase is determined by the length of overlapping straight portions of both first track 241 and third track 243.

Figure 7:
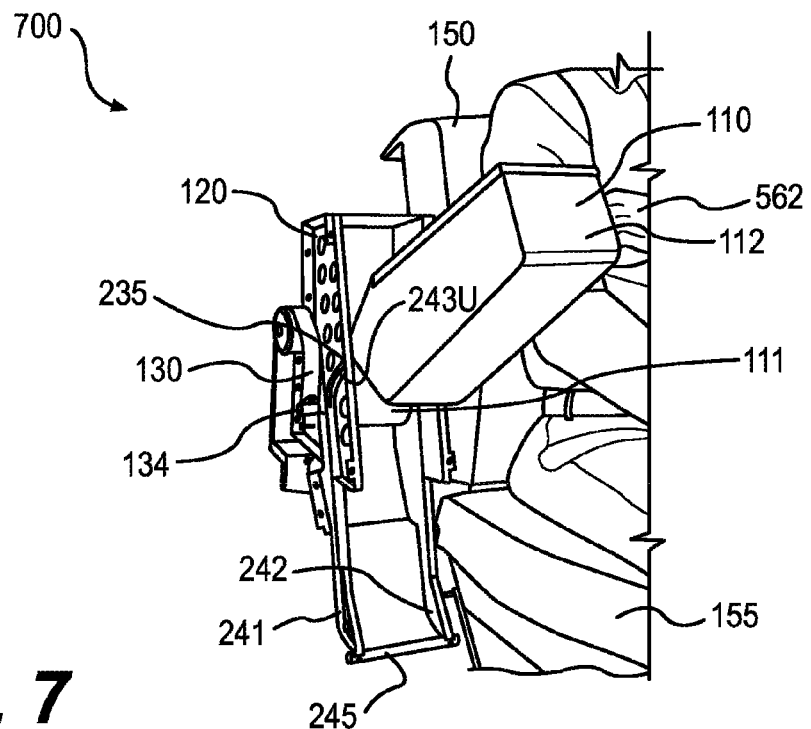
FIG. 7 is a perspective view showing an embodiment of an articulating armrest during an articulation phase of deployment.

FIG. 7 is a perspective view showing an articulating armrest 700 during the articulation phase of deployment of member 110. Note that the user's hand 562 is still not touching member 110 as the deployment occurs automatically due to tension provided by spring 130. In an embodiment, a gas spring (see item 1630, FIG. 16) is coupled to first protrusion 134 to control the speed of member 110 as it pivots outward and downward over couch bottom 155, thereby preventing member 110 from slamming down.

Figure 20:
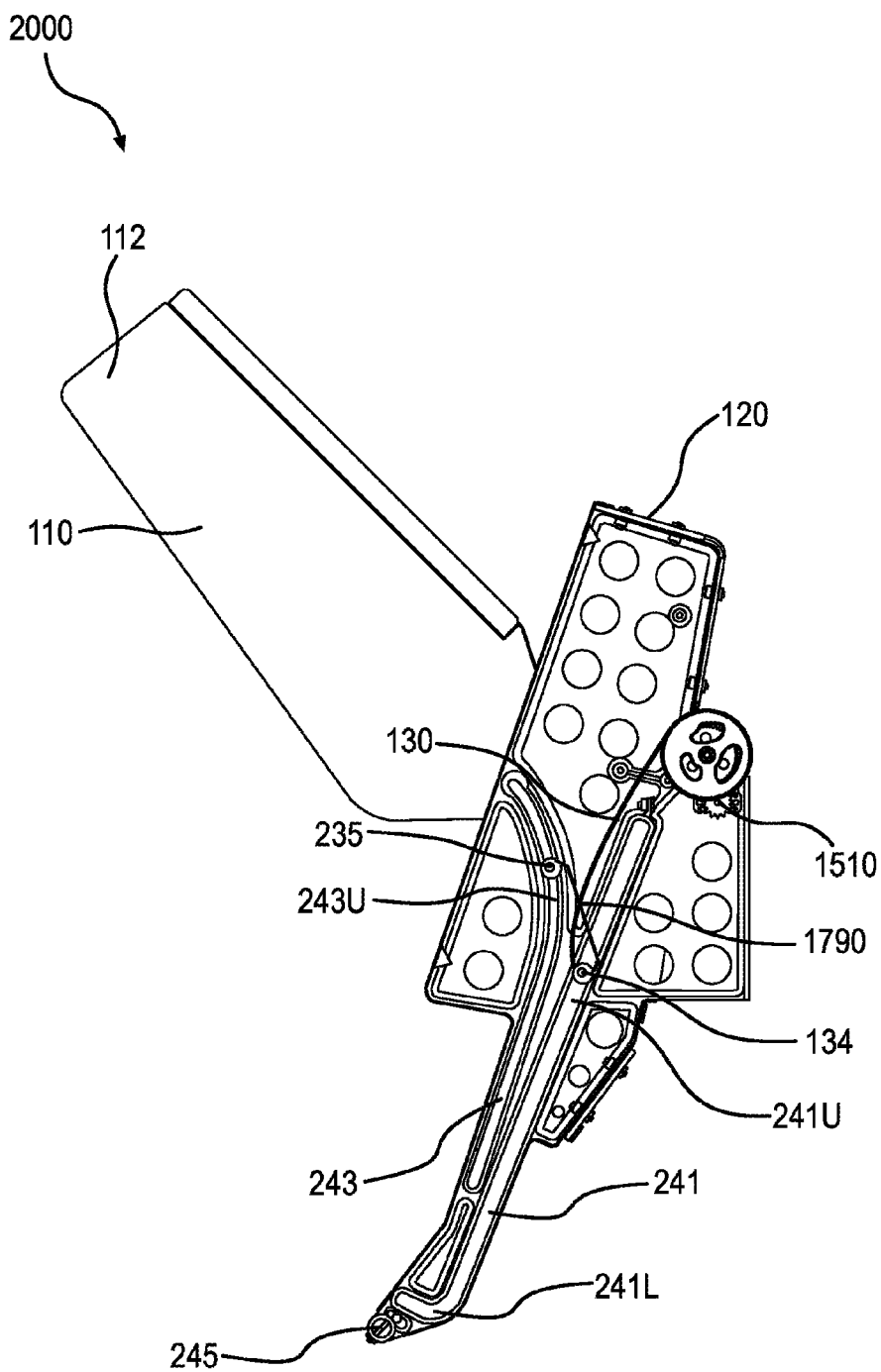
FIG. 20 shows a side view of an articulating armrest in an articulation phase of deployment, in an embodiment.

FIG. 20 shows an articulating armrest 2000 during the articulation phase of deployment of member 110. This phase is marked by second protrusion 235 diverging into a curved portion of upper third track 243U, while first protrusion 134 continues translating upwards (in a relatively linear fashion) within first track 241L. The result is that second protrusion 235 diverges outwards in the deployment direction while the first protrusion 134 simultaneously continues translating upward, which causes member 110 to articulate out of housing 120.

Figure 8:
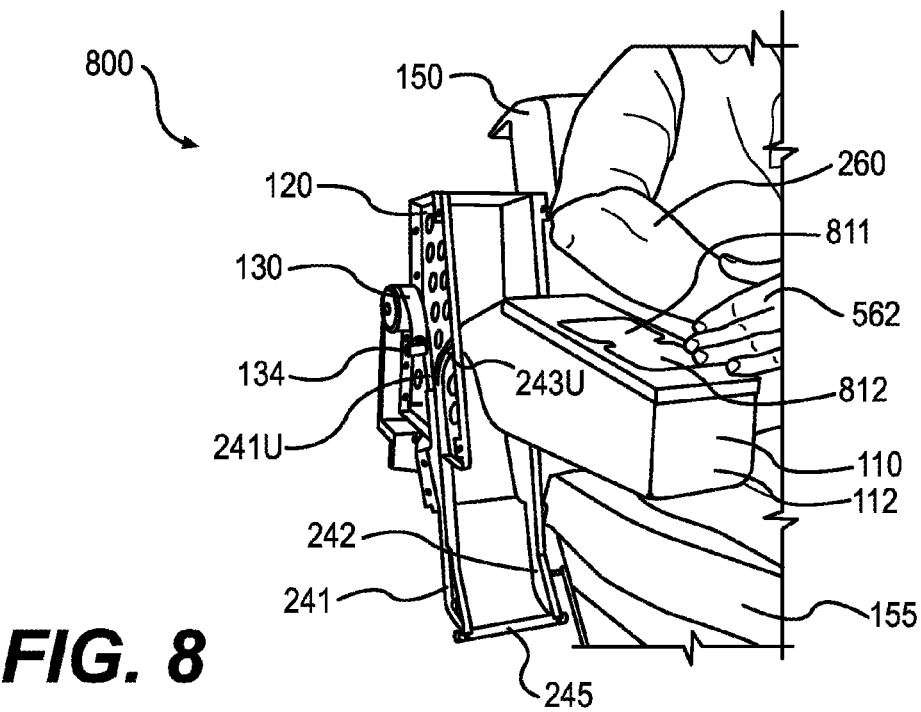
FIG. 8 is a perspective view showing an embodiment of an articulating armrest being pressed into a fully deployed position.

FIG. 8 is a perspective view showing an articulating armrest 800 during the securement phase of deployment of member 110. Note that spring 130 is nearly fully coiled and user's hand 562 is in position to press member 110 down to secure it in a fully deployed position. Member 110 may include one or more cup holders, such as a first cup holder 811 and a second cup holder 812.

Figure 21:
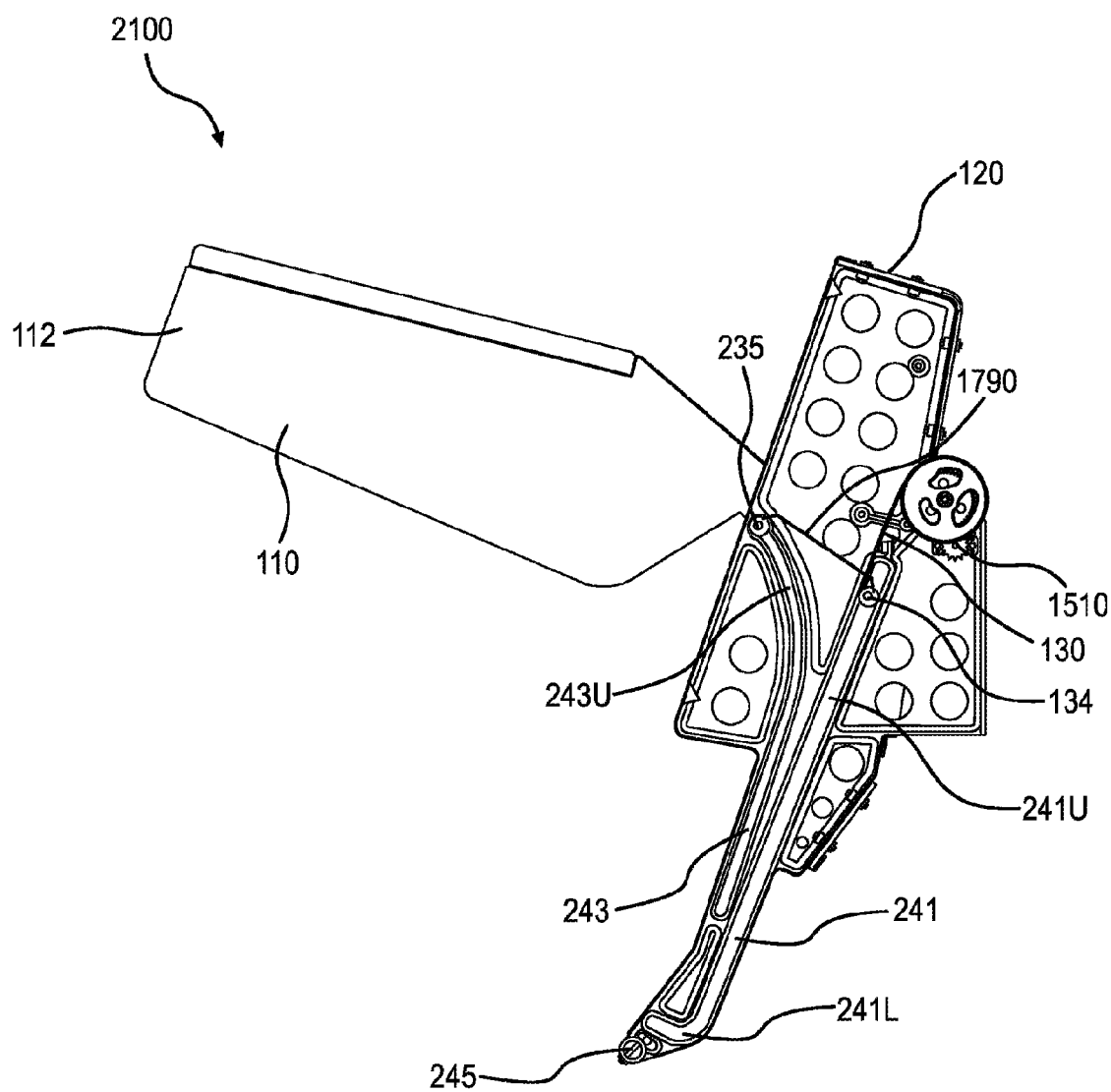
FIG. 21 shows a side view of an articulating armrest in a securement phase of deployment, in an embodiment.
Figure 22:
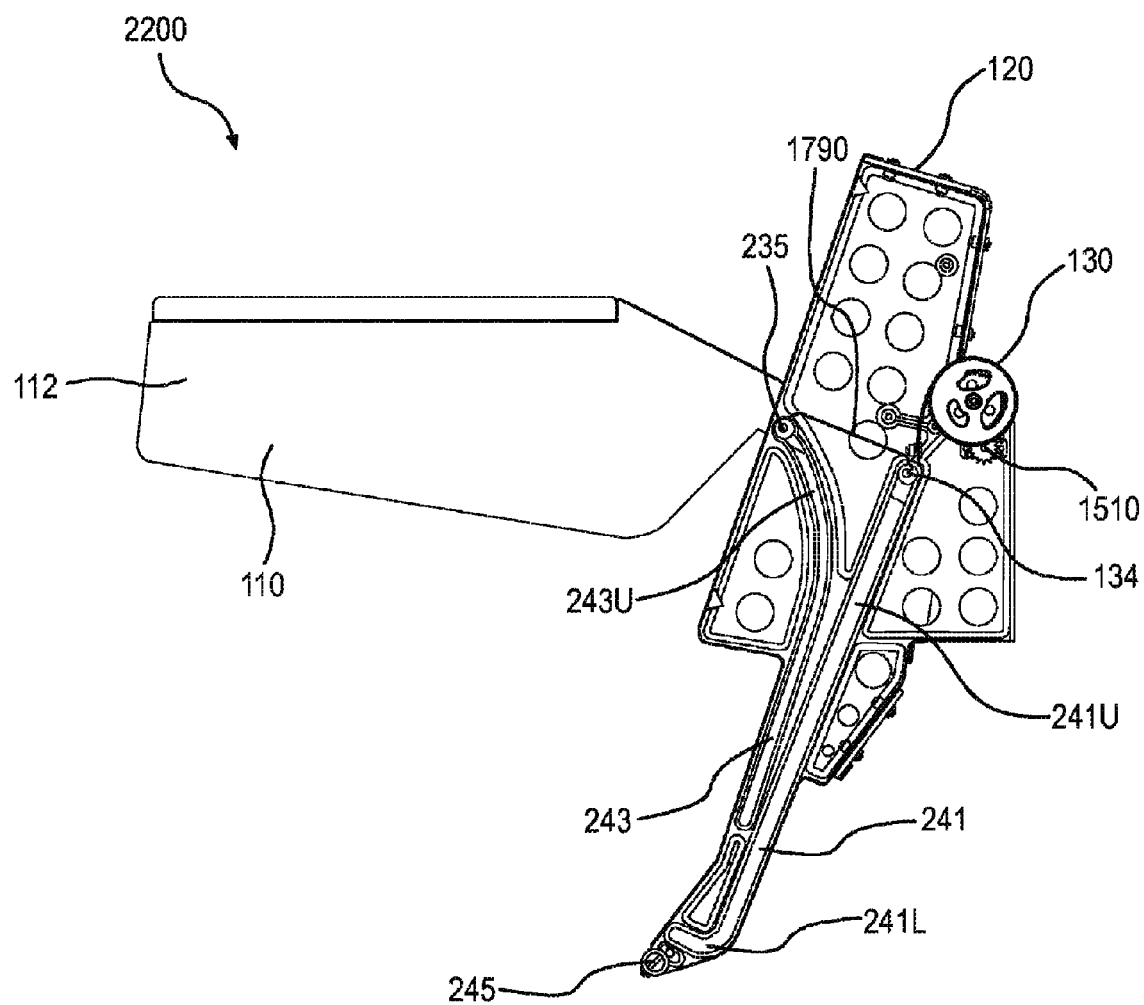
FIG. 22 shows a side view of an articulating armrest in the deployed position, in an embodiment.

FIG. 21 shows a first side view of member 110 during the securement phase of deployment of member 110. This phase is marked by second protrusion 235 being located at the top end of upper third track 243, while first protrusion 134 continues translating upwards within upper first track 241U. The result is that member 110 pivots about second protrusion 235. When first protrusion 134 and second protrusion 235 reach the top of the first track 241 and third track 243, respectively, as depicted in FIG. 22, the securement phase of deployment is complete and member 110 is fully deployed.

By performing the four distinct phases of deployment in reverse, member 110 may be stowed in housing 120 as described in connection with FIGS. 9-12. When performed in reverse for stowing, the positions of the release phase and the securement phase are swapped compared to deployment. Thus, the order for the four distinct phases in reverse are 1) release-for-stowing, 2) articulation, 3) translation, and 4) securement-for-stowing. See method 1400, FIG. 14 and the accompanying description below for an exemplary method for stowing an articulating armrest.

Figure 9:
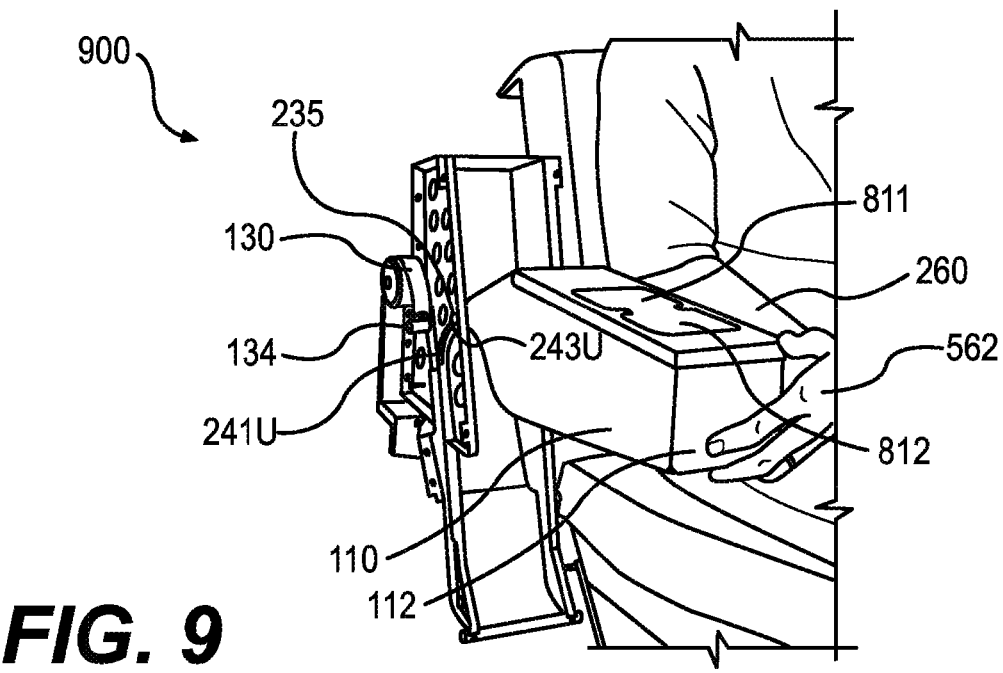
FIG. 9 is a perspective view showing an embodiment of an articulating armrest in the deployed position as a user initiates a release-for-stowing phase.

FIG. 9 is a perspective view showing an articulating armrest 900 in the deployed position as a user initiates the release-for-stowing phase to stow member 110. The user's hand 562 is in position beneath tip 112. By pushing upward on tip 112, member 110 pivots about second protrusion 235 which remains stationary, and first protrusion 134 moves from the top of first upper track 241U as depicted in FIG. 22 downward to the position depicted in FIG. 21, and spring 130 is partially extended, thereby releasing member 110 from the deployed position.

Figure 10:
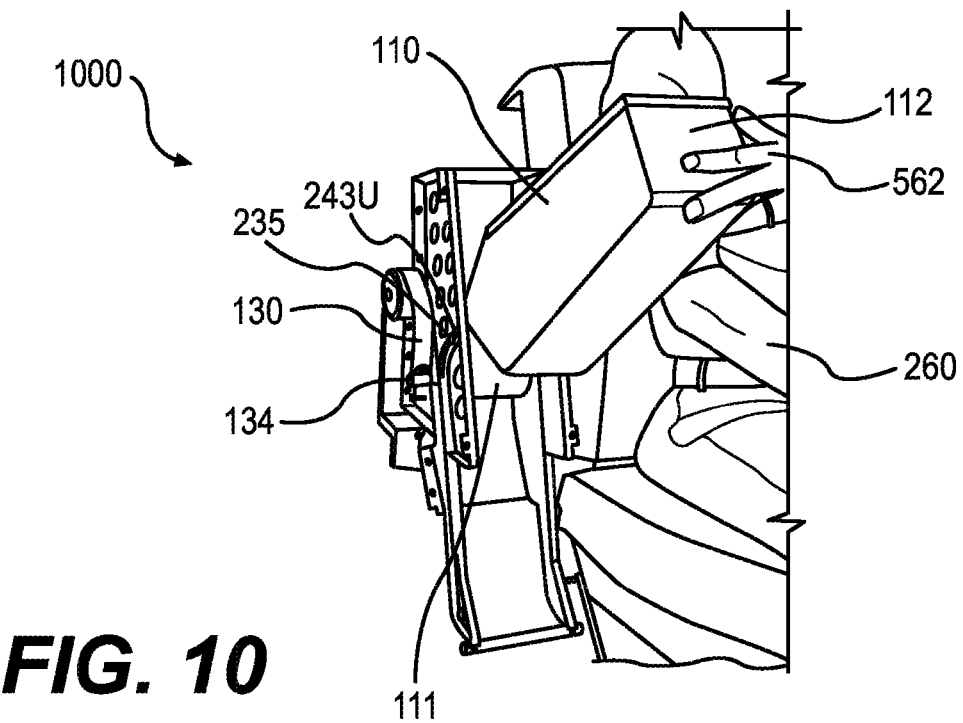
FIG. 10 is a perspective view showing an embodiment of an articulating armrest being pushed upward during an articulation phase for stowing.

FIG. 10 is a perspective view showing an articulating armrest 1000 as the user's hand 562 is pushing tip 112 upward during the articulation phase. As depicted in FIG. 20, first protrusion 134 moves linearly downward in first track 241, while second protrusion 235 moves downward through the curved portion of upper third track 243U. Both first and second protrusions 134, 235 translate within their respective tracks 241, 243, while member 110 simultaneously pivots about second protrusion 235, and spring 130 is further extended, thereby articulating member 110.

Figure 11:
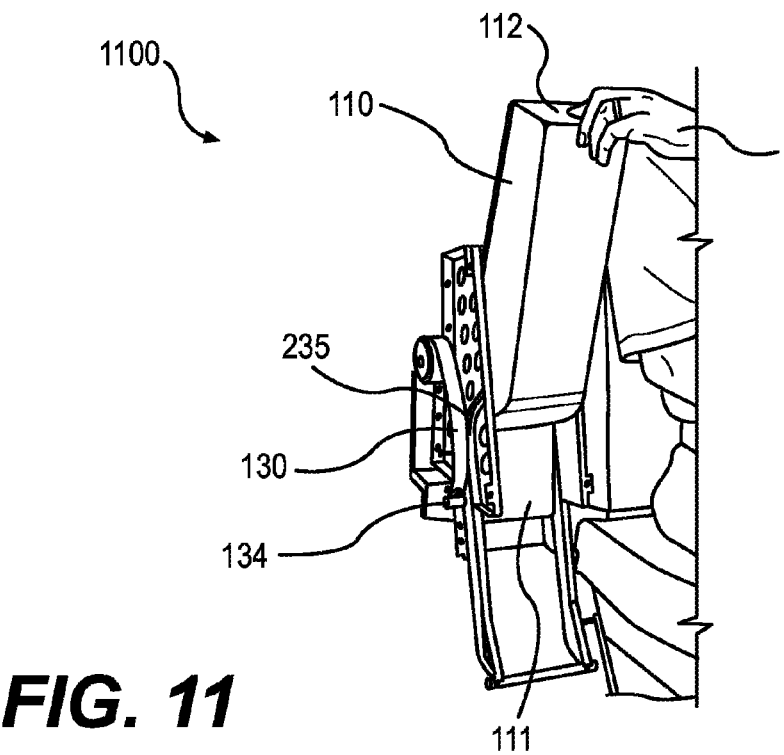
FIG. 11 is a perspective view showing an embodiment of an articulating armrest being pushed downward for stowing during a translation phase.

FIG. 11 is a perspective view showing an articulating member 1100 being stowed as the user's hand 562 pushes tip 112 downward during the translation phase. Once member 110 has completed pivoting, pressing downward on tip 112 translates member 110 linearly downward. As depicted in FIG. 19, both first protrusion 134 and second protrusion 235 are located in substantially straight portions of first track 241 and third track 243, respectively, and spring 130 is further extended compared to FIG. 20.

Figure 12:
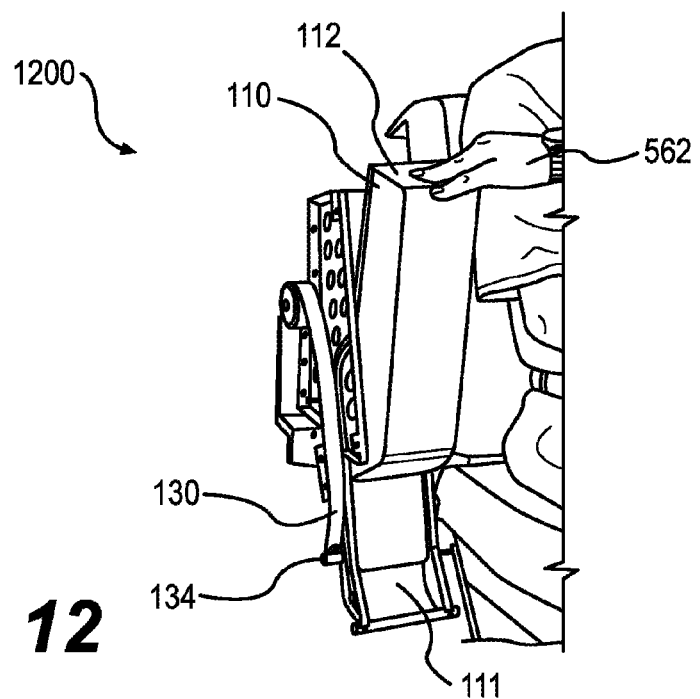
FIG. 12 is a perspective view showing an embodiment of an articulating armrest during a latter part of the translation phase for stowing into the housing.

FIG. 12 is a perspective view showing an articulating armrest 1200 during the latter part of the translation phase. The end of the translation phase and the beginning of the securement-for-stowing phase is marked by second protrusion 235 reaching the bottom of third track 243 and first protrusion reaching the hooked or curved portion of lower first track 241L as depicted in FIG. 18. The user may then press tip 112 of member 110 towards housing 120 causing member 110 to pivot about second protrusion 235. Once first protrusion 134 reaches the end of lower first track 241L, member 110 is stowed as depicted in FIG. 17.

With respect to FIGS. 9-12 and 17-22, only one side of an articulating armrest is depicted, namely the side having spring 130, first track 241 and third track 243. In certain embodiments, the opposing side of housing 120 includes second track 242 and fourth track 244 as depicted in FIG. 16. During movement of member 110 between each of the four distinct transition phases described above, first protrusion 134 moves within first track 241 and second track 242, while second protrusion 235 moves within third track 243 and fourth track 244.

In an embodiment, an electric motor is configured to both pull and push first protrusion 134 along first track 241, thereby providing automatic assistance for deploying and stowing member 110.

Figure 13:
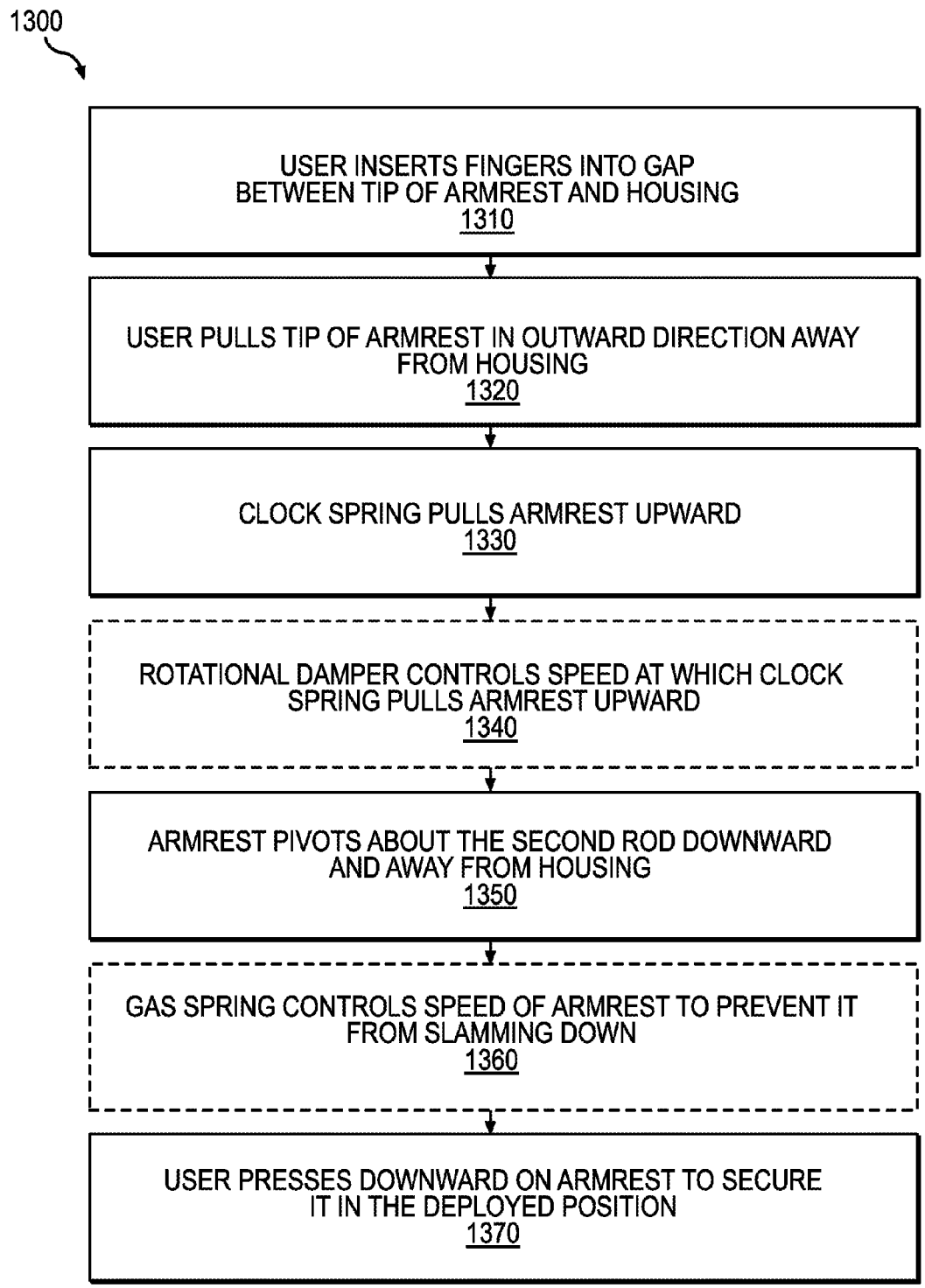
FIG. 13 is a block diagram of a method for deploying an articulating armrest, in an embodiment.

FIG. 13 is a block diagram of a method 1300 for deploying an articulating armrest, such as articulating armrest 100, FIG. 1.

In a step 1310, a user accesses the tip of the armrest via a gap between the tip of the armrest and the housing. In an example of step 1310, a user inserts his or her fingers into gap 125 between tip 112 of member 110 and housing 120, FIG. 1.

In a step 1320, the user retrieves the tip of the armrest by pulling in an outward direction away from the housing. In an example of step 1320, tip 112 is pulled outward away from housing 120 through the release phase of deployment to the position shown in FIG. 5. In the release phase of deployment, first protrusion 134 moves from the end of lower first track 241L as depicted in FIG. 17 through the hooked or curved portion of lower first track 241L as depicted in FIG. 18, and member 110 pivots about second protrusion 235 which remains stationary.

In a step 1330, a mechanical tension device pulls the armrest upward. In an example of step 1330, spring 130 pulls member 110 upward through the translation phase to the position shown in FIG. 6. First protrusion 134 and second protrusion 235 are shown in the substantially straight portions of first track 241 and third track 243, respectively, during the translation phase as depicted in FIG. 19.

In an optional step 1340, a rotational damper controls the speed at which the spring pulls the armrest upward. In an example of step 1340, a rotational damper 1510, FIG. 15 controls the speed at which spring 130 pulls member 110 upward.

In a step 1350, the armrest pivots downward and away from the housing. In an example of step 1350, tip 112 pivots about second protrusion 235 downward and away from housing 120 during the articulation phase of deployment. As depicted in FIG. 20, second protrusion 235 is located in the curved portion of upper third track 243U marking the articulation phase.

In an optional step 1360, a gas spring controls the speed at which the armrest lowers to prevent it from slamming down. In an example of step 1360, a gas spring 1630, FIG. 16 controls the speed that member 110 lowers into the fully deployed position.

In a step 1370, the user presses downward on the armrest to secure it in the deployed position. In an example of step 1370, the user presses downward on member 110 as shown in FIG. 8 during the securement phase of deployment. The user may press down on member 110 using a hand or forearm, or in any other suitable manner. In an embodiment, member 110 may "snap" or "click" into the fully deployed position. As depicted in FIG. 21, second protrusion 235 is located at the end of upper third track 243U. Once the user presses downward, member 110 pivots about second protrusion 235 which remains stationary, and first protrusion 134 translates from the location shown in FIG. 21 to the top of the first upper track 241U as depicted in FIG. 22.

FIG. 14 is a block diagram of a method 1400 for stowing an articulating armrest, such as articulating armrest 200, FIG. 2.

In a step 1410, a user may pull up on the tip of the armrest away from the couch bottom causing the tip to pivot upwards and inwards towards the housing. In an example of step 1410, the user pulls up on tip 112 to initiate the release-for-stowing phase, beginning with member 110 in the fully deployed position depicted in FIGS. 9 and 22, pivoting about second protrusion 235 to the position shown in FIG. 21, and continuing to the articulation phase depicted in FIGS. 10 and 20.

In a step 1420, the user may press downward on the armrest to lower it into a housing. In an example of step 1420, the user may press downward on tip 112 to lower it into housing 120, beginning with member 110 in the raised and position depicted in FIG. 11, moving through the translation phase depicted in FIG. 19 to the position depicted in FIG. 12.

In a step 1430, the user may press downward and inward on the tip of the armrest to secure it in the housing. In an example of step 1430, the user may press downward to complete the translation phase, as shown in FIG. 18, and inward on tip 112 to initiate the securement-for-stowing phase to pivot to the stowed position shown in FIG. 17.

In an embodiment, an electric motor is mechanically coupled to first protrusion 134 for pulling downward along first track 241 to provide assistance for stowing member 110.

FIG. 15 is a perspective view showing a first side view of an exemplary articulating armrest 1500 in the deployed position, which is an example of articulating armrest 200, FIG. 2. First protrusion 134 may include roller bearings to provide smooth movement within first track 241. Likewise, each second protrusion 235 may include roller bearings to provide smooth movement within second track 242. Rotational damper 1510 is configured to control the speed at which spring 130 pulls on first protrusion 134.

FIG. 16 is a perspective view showing a second side view of an exemplary articulating armrest 1600 in the deployed position. The second side shown in FIG. 16 is opposite the first side shown in FIG. 15. First protrusion 134 may include roller bearings to provide smooth movement within second track 242. Likewise, second protrusion 235 may include roller bearings to provide smooth movement within fourth track 244. Gas spring 1630 is mechanically coupled to first protrusion 134 to control the speed of at which first protrusion 134 moves upward, thereby controlling the speed at which member 110 pivots to prevent it from slamming down into the deployed position.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. An armrest, comprising:
 a first protrusion proximate a first end, and a second protrusion at a predetermined spacing from the first protrusion; and
 a housing having a first track for guiding movement of the first protrusion, the first track having a lower curved portion and upper substantially straight portion, a second track for guiding movement of the second protrusion, the second track having a lower substantially straight portion and an upper curved portion, the movement of the first and second protrusions through the first and second tracks, respectively, relative to one another enabling the armrest to enter through a plurality of phases of deployment, comprising:
 a release phase in which the armrest is released from the housing, wherein release phase involves the first protrusion initially translating through the curved portion of the first track, and the armrest, at the same time, pivots about the second protrusion which remains stationary at a lower end of the second track thereby releasing a tip of the armrest from the housing; a translation phase in which the armrest is translated a distance; an articulation phase in which the armrest flips out of the housing; and a securement phase where the armrest is secured in place.

2. The armrest of claim 1, wherein the translation phase includes the first protrusion translating through the substantially straight portion of the first track and the second protrusion translating through the substantially straight portion of the second track.

3. The armrest of claim 2, wherein the articulation phase involves the first protrusion continuing its translation through the substantially straight portion of the first track and the second protrusion translating through the curved portion of the second track causing the armrest to simultaneously pivot and translate.

4. The armrest of claim 3, wherein the securement phase comprises the first protrusion continuing translation through the substantially straight portion of the first track and the armrest pivoting about the second protrusion which remains stationary at an upper end of the second track thereby securing the armrest in the deployed position.

5. The armrest of claim 1, wherein the housing is located within a seat back and the armrest is flush with the seat back when stowed within the housing.

6. The armrest of claim 5, wherein the housing further extends beneath a seat bottom such that the armrest extends beneath the seat bottom when stowed.

7. The armrest of claim 1, further comprising a mechanical tension device configured to provide tension to the first protrusion for pulling the first protrusion upward along the first track after the release phase.

8. The armrest of claim 7, further comprising a rotational damper configured to control the speed at which the mechanical tension device pulls the first protrusion upward thereby controlling the speed at which the armrest deploys.

9. The armrest of claim 7, wherein the mechanical tension device is a spring.

10. The armrest of claim 9, wherein the spring is a clock spring.

11. The armrest of claim 1, further comprising a gap located above an upper tip of the armrest when the armrest is stowed for accessing the tip of the armrest.

12. The armrest of claim 1, further comprising a gas spring mechanically coupled to the first protrusion to control the speed at which the first protrusion translates upward along the first track, thereby controlling the speed at which the armrest deploys.

13. A method of deploying an armrest, comprising:
providing a housing for stowing the armrest in a stowed position, the armrest being mounted on a moveable axis such that the armrest can be angularly rotated downward and outward relative to the housing and into a deployed position; and
using a mechanical tension device to provide a force to the armrest as the armrest moves from the stowed position into the deployed position, the mechanical tension device being mechanically coupled to a protrusion of the armrest and slidably secured along a track.

14. The method of claim 13, wherein the mechanical tension device is a clock spring, and a speed at which the clock spring pulls the protrusion upward is controlled by a rotational damper.

15. The method of claim 13, wherein the speed at which the armrest pivots is controlled by a gas spring mechanically coupled to the protrusion to prevent the armrest from slamming down.

16. The method of claim 13, wherein movement of the protrusion within the track is smoothed using one or more roller bearings.

17. An armrest, comprising:
a housing for stowing the armrest within a seat back, the housing comprising:
a first pair of opposing tracks configured for guiding a first protrusion of the armrest; and
a second pair of opposing tracks configured for guiding a second protrusion of the armrest; and
a mechanical tension device mechanically coupled to the housing for pulling the armrest, wherein the first protrusion translates along the first pair of opposing tracks and the second protrusion translates along the second pair of opposing tracks, and the first and second pairs of opposing tracks are configured for the armrest to articulate from a stowed position to a deployed position by pivoting and translating along a curvilinear path.

18. The armrest of claim 17, wherein the mechanical tension device is a clock spring.

19. The armrest of claim 18, further comprising a rotational damper for controlling the rate that the clock spring pulls the armrest, thereby controlling the rate that the armrest articulates from the stowed position to the deployed position.

20. The armrest of claim 17, further comprising a gas spring mechanically coupled to the armrest to control the rate of pivoting and translating along the curvilinear path from the stowed position to the deployed position.

21. A system comprising:
a first axially-aligned protrusion proximate a first end of a transversely-aligned member;
a second axially-aligned protrusion substantially parallel to the first axially-aligned protrusion, located further from the first end of the transversely-aligned member than is the first axially-aligned protrusion; and
the transversely-aligned member being deployed from a housing, the housing including:
a first slot configured for receiving and guiding the first axially-aligned protrusion, the first slot having a curved lower end and a straight upper end forming a J-shaped path (when viewed in cross-section) for guiding the first axially-aligned protrusion; and
a second slot for receiving the second protrusion, the second slot being aligned relatively adjacent the first slot, the second slot having a substantially straight lower portion and a curved upper portion (when viewed in cross-section) for guiding the second protrusion away from the first slot, such that the transversely-aligned member moves upwards and pivots outwards from the housing when deployed.

22. The system of claim 21 wherein the first axially-aligned protrusion and the second axially-aligned protrusion extend through the transversely-aligned member, and the housing further comprises:
a third slot substantially parallel to the first slot on an opposite side of the housing forming a first pair of opposing slots; and
a fourth slot substantially parallel to the second slot on the opposite side of the housing, being aligned relatively adjacent the third slot, forming a second pair of opposing slots.

* * * * *